No. 814,557. PATENTED MAR. 6, 1906.
M. MOORE & T. J. HESKETT.
APPARATUS FOR THE TREATMENT OF ORE FOR THE MANUFACTURE OF IRON
AND STEEL THEREFROM.
APPLICATION FILED AUG. 15, 1904.

Witnesses:

Inventors
Montague Moore
Thomas J. Heskett
By James L. Norris.
Atty

No. 814,557. PATENTED MAR. 6, 1906.
M. MOORE & T. J. HESKETT.
APPARATUS FOR THE TREATMENT OF ORE FOR THE MANUFACTURE OF IRON AND STEEL THEREFROM.
APPLICATION FILED AUG. 15, 1904.

Inventors
Montague Moore
Thomas J. Heskett
James L. Norris
Atty

Witnesses

No. 814,557. PATENTED MAR. 6, 1906.
M. MOORE & T. J. HESKETT.
APPARATUS FOR THE TREATMENT OF ORE FOR THE MANUFACTURE OF IRON AND STEEL THEREFROM.
APPLICATION FILED AUG. 15, 1904.

Witnesses:
Inventors
Montague Moore
Thomas J. Heskett

No. 814,557. PATENTED MAR. 6, 1906.
M. MOORE & T. J. HESKETT.
APPARATUS FOR THE TREATMENT OF ORE FOR THE MANUFACTURE OF IRON AND STEEL THEREFROM.
APPLICATION FILED AUG. 15, 1904.

Witnesses
Ed Hesler
James L. Norris Jr.

Inventors
Montague Moore
Thomas J. Heskett
By James L. Norris
Atty.

UNITED STATES PATENT OFFICE.

MONTAGUE MOORE, OF MELBOURNE, AND THOMAS JAMES HESKETT, OF BRUNSWICK, VICTORIA, AUSTRALIA.

APPARATUS FOR THE TREATMENT OF ORE FOR THE MANUFACTURE OF IRON AND STEEL THEREFROM.

No. 814,557.      Specification of Letters Patent.      Patented March 6, 1906.

Application filed August 15, 1904. Serial No. 220,802.

*To all whom it may concern:*

Be it known that we, MONTAGUE MOORE, residing at No. 34 Collins street, Melbourne, and THOMAS JAMES HESKETT, residing at 86 Donald street, Brunswick, in the State of Victoria and Commonwealth of Australia, subjects of the King of Great Britain, have invented certain new and useful Improvements in Apparatus for Treating Ferruginous Ore for the Manufacture of Iron and Steel Therefrom, of which the following is a specification.

This invention has been devised mainly for the purpose of manufacturing iron and steel from what are known as "magnetic-iron sands," such as those found in the Colony of New Zealand and elsewhere; but it is equally applicable for treating any ferruginous ore, which has been crushed or ground to a state of comminution.

In the specification and drawings accompanying an application for Letters Patent filed by us in the United States of America, on the 25th day of January, 1904, Serial No. 190,587, we have described and illustrated an apparatus for treating ferruginous ore for the manufacture of iron and steel therefrom in which the action is intermittent, inasmuch as the ore which is first heated and subsequently subjected to the reducing action of carbonic-oxid or hydrocarbon gas is retained until a charge has collected in a passage leading from the deoxidizing-chamber to a Siemens or other gas-furnace.

According to our previous invention the apparatus consists, essentially, of a heating-chamber, a deoxidizing-chamber, and a Siemens or other gas-furnace, the latter being connected to the deoxidizing-chamber by means of a passage or pipe in which the ore after being completely deoxidized and reduced to fine particles of metallic iron is retained until sufficient is obtained to form a charge, when it is allowed to pass into the Siemens or other gas-furnace.

Now by our present invention the ore passes in a continuous stream through the heating and deoxidizing chambers to the Siemens or other gas-furnace, and consequently a considerable saving of time is effected in converting it into iron or steel.

Referring to the drawings hereto annexed, in which similar letters refer to similar parts throughout the several views.

Referring to Figs. 1, 2, 3, and 4 of the drawings, A is a vertical square brick tower incased outwardly with iron and supported on four piers B, said tower containing a number of shelves C on either side thereof and arranged in series one above the other and approximately at an angle of forty-five degrees below the horizontal, those on one side alternating with those on the other. D is a Siemens or other gas-furnace below the tower and directly connected to the bottom thereof. E is a vertical brick regenerating-chamber at the side of the tower A and extending from a point about midway of the height thereof to the top of said gas-furnace. E' designates flues through which the waste heat passes from the gas-furnace D to the regenerating-chamber E and then by way of flues $E^2$, $E^3$, and $E^4$ therein to the tower through outlet $E^5$. $E^6$ and $E^7$ are passages connecting said flues $E^2$, $E^3$, and $E^4$ through the air-flues hereinafter referred to. $E^8$ is a valve to regulate the supply of air passing through flues $E^9$ and $E^{10}$ in the regenerating-chamber E to the passage $E^{11}$, leading to the gas-furnace D. $E^{12}$ and $E^{13}$ are passages through the waste-heat flues and connecting said flues $E^9$ and $E^{10}$. $E^{14}$ is a wall in the air-flues $E^9$ and $E^{10}$ and which wall extends from the bottom very nearly to the top of said regenerating-chamber. This wall has the effect of delaying the passage of the air through the regenerating-chamber, as it has to pass up one side and down the other, and consequently by the time it reaches the furnace it is quite hot. F is a tube in the center of the tower extending downward from the top thereof to about midway of its height, where it passes through a projection or shelf G, which extends from one side of the tower into a chamber G' on the outside of the opposite wall of said tower. This projection or shelf G on its upper side forms an acute angle with the side of the tower A from which it projects, and is for the purpose of leading the ore to be treated and which is fed to the top of the tower and falls from shelf to shelf therein into the said chamber G' to form a seal therein to prevent the deoxidizing-gas, such as carbonic-oxid gas, supplied through pipe F to the lower portion (hereinafter called the "deoxidizing-chamber" $A^2$) of the tower A, passing direct to the upper portion (hereinafter called the "heating-chamber" A') of said tower. In the lower portion of the chamber G' and beneath the projection G is a horizontal Archimedean screw $G^2$, the spindle of which extends outwardly through the wall of said chamber G' and carries on its end a pulley $G^3$, which is driven by means of a belt $G^4$, passing over another pulley $G^5$ on the driving-shaft of an elevator H, which supplies the ore to be treated to the top of the tower A through chute H'. The Archimedean screw is for the purpose of slowly feeding the ore, which falls by gravity into the chamber G', from said chamber to the deoxidizing-chamber $A^2$ below. I is a pipe for supplying a deoxidizing-gas, such as carbonic-oxid or hydrocarbon gas, from the producers (not shown) to the tube F, through which it passes to the deoxidizing-chamber $A^2$. I' is a cock in the said pipe I. J is an oil-spray for supplying hydrocarbon oil to tube F when such is used to form gas for deoxidizing purposes. The waste heat supplied to the heating-chamber A' from the gas-furnace D may in some cases not be sufficient to heat the ore passing through it to the required temperature, and to insure this result being attained we provide the heating-chamber A' on one side with a passage K, controlled by valve K', and on the other side we provide a pipe $K^2$, controlled by valve $K^3$. When extra heat is needed, valve K' is opened and a portion of the gas passing down the tube F passes therefrom into the bottom of the heating-chamber A', and at the same time valve $K^3$ is opened to admit air to said heating-chamber. When oil is to be used as fuel, auxiliary oil-spray burners are inserted into and used in the combustion-chamber of the gas-furnace D. As soon as the regenerator E and tube F have become heated oil can be sprayed into said tube. The gas-furnace is divided horizontally into two halves D D', the bottom half D' being in the shape of a saucer, which is supported at about its center by a vertical shaft $D^2$ in a cylinder $D^3$, in which it is free to move up and down. $D^4$ is a bogie-carriage which carries said cylinder $D^3$. $D^5$ is a hoop of T-iron fixed to the top half of the gas-furnace and having one flange projecting downward into a circular groove $D^6$ in the top of the bottom half D' of the gas-furnace, said groove being filled with sand to form a joint to prevent the escape of heat from the gas-furnace. The bottom half D' of the gas-furnace is lowered and raised into position by withdrawing or forcing water into the bottom of the cylinder $D^3$ through pipe $D^7$. $D^8$ is a ratchet-wheel fixed firmly on the shaft $D^2$ and is for the purpose of enabling the bottom half D' of the gas-furnace D to be rotated through the intervention of a lever $D^9$, (shown in Fig. 4,) which is pivoted at $D^{10}$ to the top of the bogie $D^4$ and is bent in the form of an elbow. At the bend of the elbow a pawl $D^{11}$ is pivoted, one end of which engages with the teeth of the ratchet-wheel $D^8$ and the other end extends sufficiently far in the opposite direction to form a bearing for the point of a spring $D^{12}$, said spring being used to keep the pawl $D^{11}$ constantly bearing against the circumference of the ratchet-wheel $D^8$ when the lever $D^9$ is moved backward and forward to rotate the lower half D' of the gas-furnace. The lever may be worked by hand or any mechanical contrivance.

Figures 5, 6, 7:
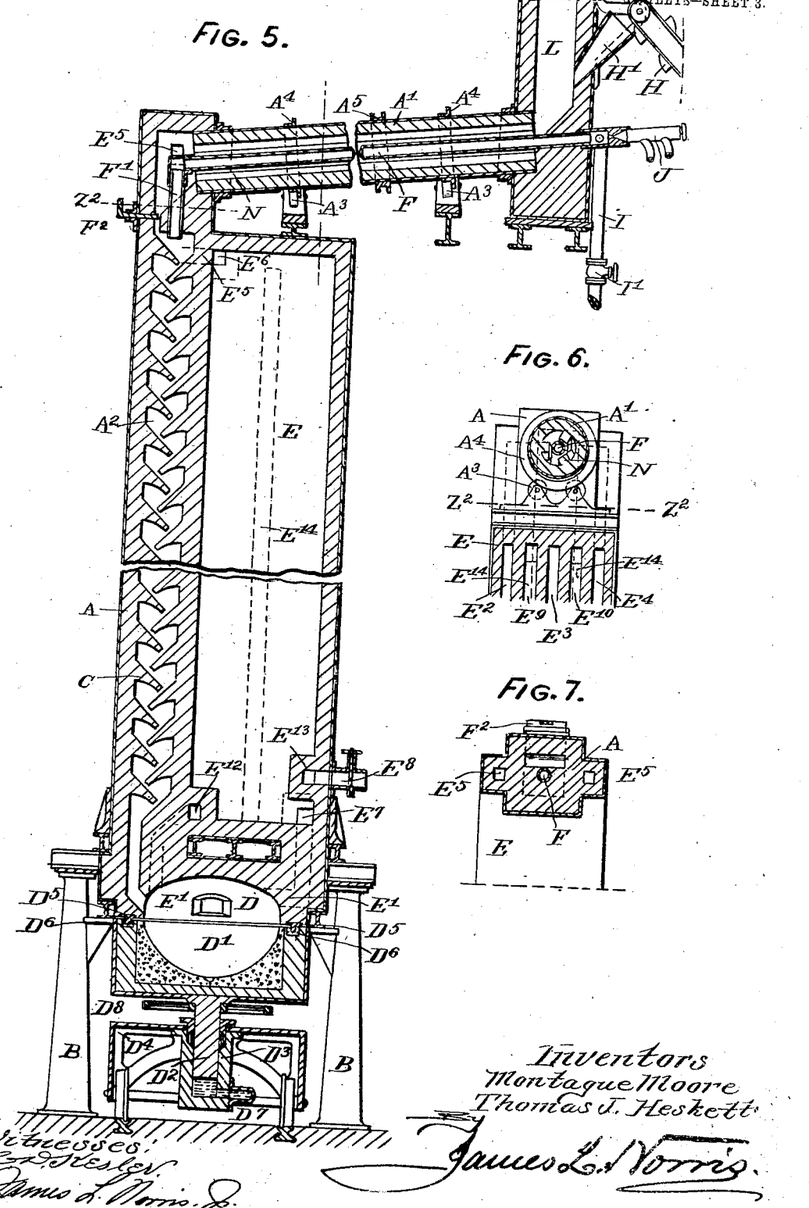
Fig. 5 is a sectional elevation of a modified form of apparatus, in which the heating of the ore is effected in a revolving cylindrical chamber and the deoxidation in a tower.
Fig. 6 embraces a cross-section of the revolving cylindrical chamber and an end elevation of portion of the same and a sectional end elevation of portion of the top of the regenerating-chamber.
Fig. 7 is a cross-section on the line $Z^2 Z^2$ of Fig. 6.

Referring to Figs. 5, 6, and 7, where a modified form of apparatus is shown, in which the heating of the ore is effected in a revolving cylindrical chamber and the deoxidation in a vertical tower, A is the tower, the whole of which in this case constitutes the deoxidizing-chamber $A^2$. D is the gas-furnace, and E the regenerating-chamber, the whole of these parts being constructed and arranged in identically the same way as described in connection with and as illustrated in Figs. 1 to 4 of the annexed drawings. A' is the heating-chamber, which is set approximately at an angle of three degrees with the horizontal, the lower end thereof being directly connected with the upper end of the deoxidizing-chamber $A^2$. The former chamber revolves on rollers $A^3$, supported at one end on top of the regenerating-chamber and at the other on a brick foundation. (Not shown.) $A^4$ designates angle-iron hoops which run on the rollers $A^3$ and prevent the chamber moving downwardly. The said chamber is revolved by means of a belt running over a grooved ring $A^5$, attached rigidly to the heating-chamber $A'$.  L is a chimney to carry away the products of combustion from the heating-chamber $A'$, this chimney being also supported by the brick foundation hereinbefore referred to. F is a pipe for conveying gas through said heating-chamber $A'$ to the top of said deoxidizing-chamber $A^2$, the said pipe being connected at its delivery end, by means of an elbow-joint, with a vertical pipe $F'$, which passes through and is supported in the topmost of the series of shelves C in said deoxidizing-chamber $A^2$, said shelf being made of a larger size for the purpose. $F^2$ is a sliding door or valve to regulate the quantity of heated ore passing into the deoxidizing-chamber $A^2$. I is a pipe to supply gas from the producers, (not shown,) and $I'$ is a cock in said pipe. J is an oil-spray for producing gas in said pipe I when gas is not supplied direct to it. H is an elevator to convey the ore to be treated to the chute $H'$ at the top end of the heating-chamber $A'$. N represents projections running longitudinally on the inside of the heating-chamber $A'$ and are for the purpose of insuring that every particle of ore being treated comes in contact with the heat in chamber $A'$.

Figures 1, 2:
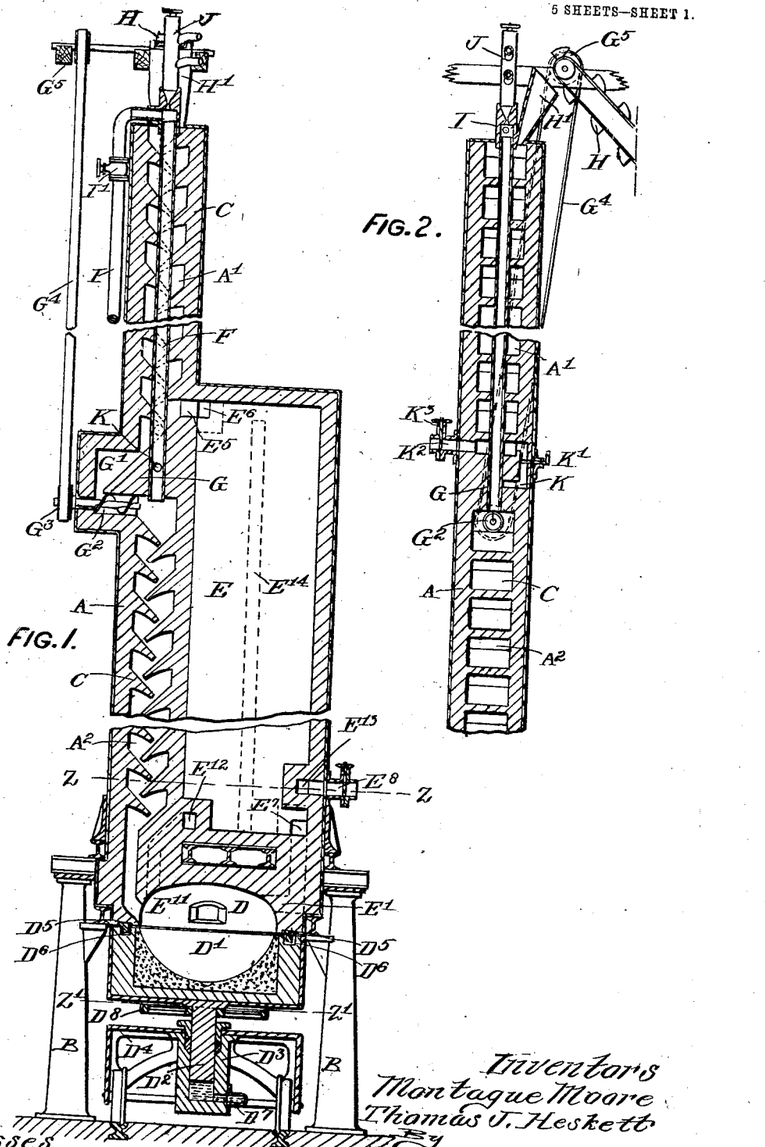
Figure 1 is a sectional elevation of an apparatus in which the heating and subsequent deoxidation of the ore is effected in a vertical tower.
Fig. 2 is a side sectional elevation of a portion of the tower illustrated in Fig. 1.
Figure 3:
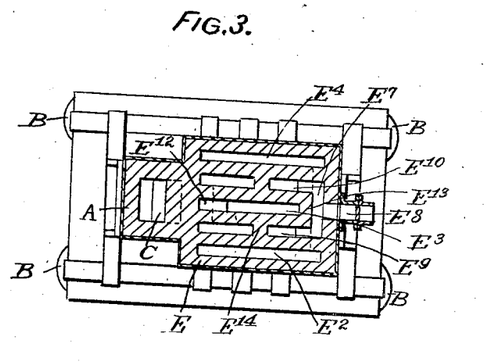
Fig. 3 is a cross-section of Fig. 1 on the line Z Z.
Figure 4:
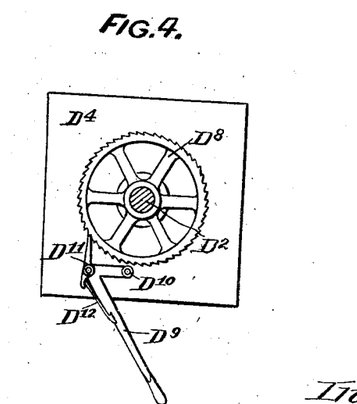
Fig. 4 is a cross-section of Fig. 1 on the line Z' Z', which shows a plan view of the bogie-carriage on which the lower half of the gas-furnace is carried and the means for rotating the same.
Figure 8:
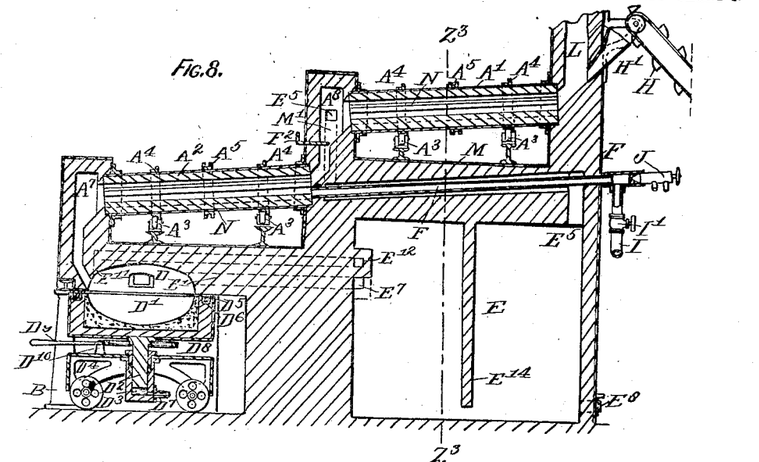
Fig. 8 is a side elevation of another modified form of apparatus in which the heating and subsequent deoxidation of the ore is effected in revolving cylindrical chambers.
Figure 9:
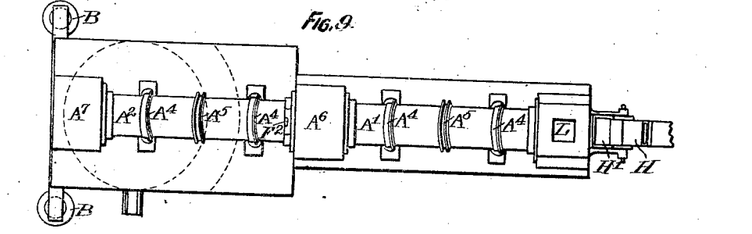
Fig. 9 is a plan of Fig. 8.
Figure 10:
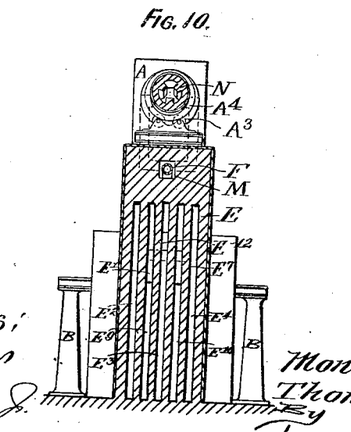
Fig. 10 is a cross-section on the line $Z^3 Z^3$, Fig. 8.

Referring to Figs. 8, 9, and 10, where a further modified form of apparatus is shown, in which the heating and subsequent deoxidation of the ore is effected in revolving cylindrical chambers, $A'$ is the heating-chamber, and $A^2$ the deoxidizing-chamber. These two chambers, as will be seen on reference to the drawings, are supported on a brick foundation and are set approximately at an angle of about three degrees with the horizontal, the heating-chamber $A'$ being at a higher elevation than the deoxidizing-chamber $A^2$. The lower end of the former is connected to the upper end of the latter by means of a vertical passage $A^6$. $A^7$ is another vertical passage which connects the lower end of the deoxidizing-chamber $A^2$ with the gas-furnace D, which is constructed and operated in exactly the same way as heretofore described and as illustrated in Figs. 1, 4, and 5 of the drawings. E is the regenerating-chamber, which is placed underneath the heating-chamber $A'$ and is fitted internally with the same arrangement of flues and passages as described in connection with and as illustrated in Figs. 1 and 3 of the drawings. The wall $E^{14}$, however, as will be seen, extends from the top of the regenerating-chamber E to very nearly the bottom thereof instead of from the bottom to very nearly the top thereof and is in the waste-heat flues instead of the air-flues, as shown in Fig. 1, while the waste heat passes from the gas-furnace to the upper left-hand corner of the regenerating-chamber E instead of the bottom, as previously described, and illustrated in Fig. 1. The passage through which the heated air passes from the regenerating-chamber E to the gas-furnace is also situated on the upper left-hand side of the regenerating-chamber immediately above the passage which conveys the waste heat to the regenerating-chamber E. $E'$ designates the waste-heat flues, and $E^{11}$ is the passage through which heated air passes from the regenerating-chamber to the gas-furnace. $E^3$ is the valve to regulate the supply of air passing through the flues in the regenerating-chamber to the gas-furnace. $E^5$ is the outlet for the waste heat from the regenerating-chamber E to the heating-chamber $A'$ by way of passages M and $M^7$. F is a tube in the passage M and which tube extends as far as the upper end of the deoxidizing-chamber $A^2$. I is a pipe to supply gas from the gas-producers, (not shown,) and $I'$ is a cock in said pipe. J is an oil-spray for producing gas in said pipe when gas is not supplied direct to it. H is an elevator to convey the ore to be treated to the chute $H'$ at the top end of the heating-chamber $A'$. $F^2$ is a slide-valve to regulate the flow of ore from the heating-chamber $A'$ to the deoxidizing-chamber $A^2$. $A^3$ designates rollers upon which both chambers $A'$ and $A^2$ revolve. $A^4$ designates angle-iron hoops which run on the rollers $A^3$ and prevent the chambers moving downwardly. The said chambers are revolved by the same mechanism as illustrated in Fig. 5.

Figure 11:
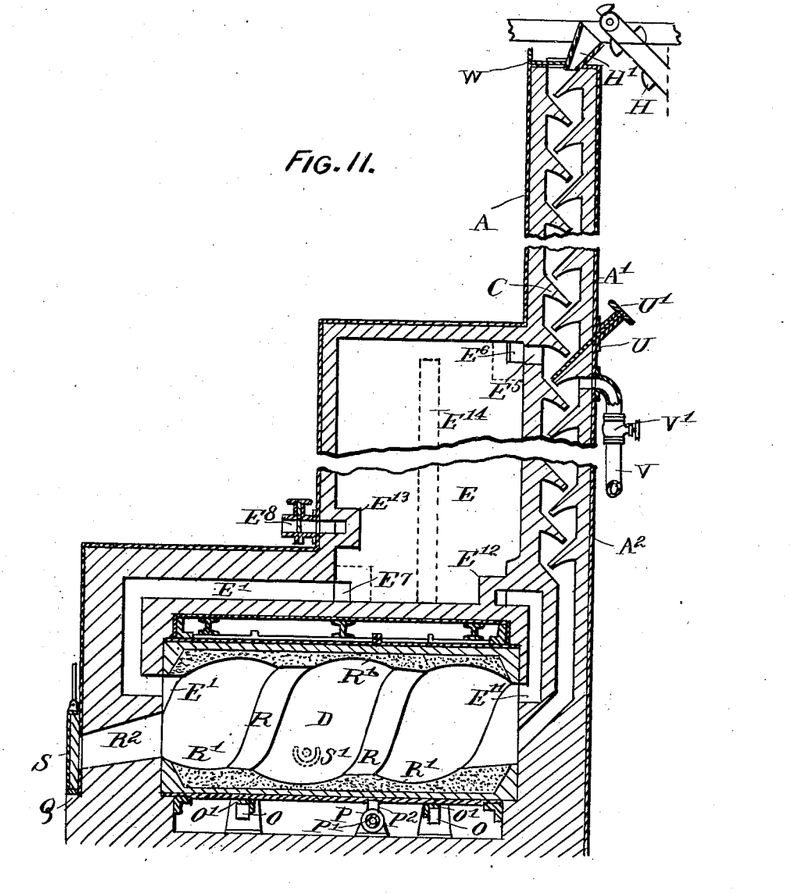
Fig. 11 is a side elevation of a further modified form of apparatus in which the heating and subsequent deoxidation of the ore is effected in a vertical tower and which apparatus embodies an improvement in the gas-furnace for balling up and conveying the metal therefrom.
Figure 12:
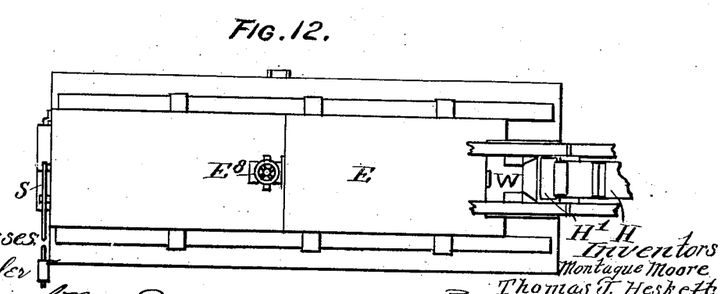
Fig. 12 is a plan of Fig. 11.

Referring to Figs. 11 and 12, where another modified form of apparatus is shown, in which the heating and subsequent deoxidation of the ore is effected in a vertical tower, A is a vertical square brick tower incased with iron supported on a brick foundation. Said tower contains a number of shelves C on either side thereof and arranged in series one above the other and approximately at an angle of about forty-five degrees below the horizontal, those on one side alternating with those on the other. The upper portion of the tower constitutes a heating-chamber $A'$ and the lower portion a deoxidizing-chamber $A^2$. At the bottom and on one side of the tower is a revolving gas-furnace D, which is supported on rollers O. $O'$ represents angle-iron hoops which run on the rollers O and prevent the gas-furnace D moving from its position. Motion is given to the gas-furnace by means of a screw P and pinion $P'$, working in a toothed wheel $P^2$, running round the outside of the furnace D. Said furnace is embedded at one end in the foundation of the tower and at the other end in a similar mass of brickwork Q. The inside of the gas-furnace D is constructed in the manner of a screwed nut, a helical projection R running from one end to the other, and by revolving the gas-furnace D the metallic iron supplied to it from the tower is forced along the grooves $R'$, formed by the projection R to the passage $R^2$, leading to the door S. S' is a tapping-hole for slag. E is a vertical brick regenerating-chamber supported on H-girders immediately above the furnace D and extending to a point about midway of the height of the tower A, said chamber being divided into a number of flues, as shown in Figs. 1 and 3, for the purpose of conveying the waste heat from the gas-furnace D to the heating-chamber A' of the tower A and air to the said gas-furnace D. $E^8$ is a valve to regulate the supply of air passing through the regenerator to the furnace D by the passage $E^{11}$. $E^{14}$ is a wall in the air-flues extending from the bottom to a point near the top of the regenerator. The object of the wall is to delay the passage of air through the regenerator by causing it to pass up and then down the opposite side of the wall before it reaches the furnace, when it is quite hot. The waste heat from the furnace D passes along the passage E' through the regenerator to the tower through the outlet $E^5$. U is a valve, and U' a wheel which operates valve U and regulates the flow of ore from the heating-chamber A' to the deoxidizing-chamber $A^2$. V is a pipe for admitting gas from the producers (not shown) to the deoxidizing-chamber $A^2$. V' is a cock in said pipe V. H is an elevator which delivers the ore to be treated to the chute H'. W is a sliding door at the top of the tower to regulate the draft and to prevent the ingress of air to the tower in any large quantity. S is an ordinary furnace-door made of brickwork and incased with iron.

The mode of operation is as follows: The gas-furnace is first heated in the ordinary way, and a deoxidizing-gas is then admitted by pipe I to the deoxidizing-chamber $A^2$, whether that chamber consists of a vertical tower, a portion thereof, or a revolving cylindrical chamber, through which it passes to the gas-furnace, where it comes in contact with the air admitted to the gas-furnace by passage $E^{11}$ at the end of the furnace nearest the heating-chamber. When combustion ensues, the heat thus generated passes along the flue E', through the regenerating-chamber E, to the heating-chamber A' by the outlet $E^5$. Concentrated and separated ore is fed to the top of the heating-chamber A' by means of an elevator H and passes therethrough, every particle being exposed to the heat, and by the time it reaches the deoxidizing-chamber $A^2$ it is red hot. It then passes through the deoxidizing-chamber $A^2$ and by the time it reaches the revolving gas-furnace D it is completely deoxidized and reduced to fine particles of metallic iron. In the gas-furnace it is fused and balled up as wrought-iron. The rotary motion imparted to the furnace illustrated in Fig. 11 causes the metallic iron to be forced along the groove R', formed by the helical projection R on the inside of the said gas-furnace and is in this manner formed into balls and forced into the passage $R^2$, leading to the door S. The slag is drawn from the furnace by the tapping-hole S'.

In the manufacture of steel the helical projection R in the gas-furnace illustrated in Fig. 11 will be dispensed with and the inside made in the form of an oval or barrel shape.

The gas-furnace illustrated in Figs. 1, 5, and 8, as will be seen, is set horizontally, whereby the reduced ore suplied thereto as it is carried round by the revolution of the bottom half is spread therein to a uniform depth in said furnace. The said lower portion of the furnace is revolved at such a speed that in one revolution the metallic particles of iron are completely melted. Another advantage of so arranging the furnace is that there is always a clean surface in the furnace at that part where the metallic particles of iron are delivered to it.

Having now particularly described and ascertained the nature of our said invention and in what manner the same is to be performed, we declare that what we claim is—

1. In an apparatus for treating ores, the combination of a heating-chamber, a deoxidizing-chamber, a gas-furnace and a regenerating-chamber, a vertical passage for establishing communication between the heating-chamber and the deoxidizing-chamber, a vertical passage for establishing communication between the deoxidizing-chamber and the gas-furnace, a plurality of flues and a passage for establishing communication between the gas-furnace and the regenerating-chamber, and a tube communicating with said deoxidizing-chamber and provided with a gas-supply pipe and an oil-spray.

2. The combination with a heating-chamber, a deoxidizing-chamber, a gas-furnace and a regenerating-chamber, of flues and a passage for connecting the gas-furnace with said regenerating-chamber, and a tube communicating with the upper end of said deoxidizing-chamber and provided with a gas-supply pipe and an oil-spray.

3. In an apparatus for treating ores, a rotatable heating-chamber adapted to communicate with a source of supply, a gas-furnace, a rotatable deoxidizing-chamber arranged over the gas-furnace and adapted to communicate with the heating-chamber and with the gas-furnace, a regenerating-chamber arranged below the heating-chamber and adapted to communicate with the gas-furnace, and a tube communicating with the upper end of said deoxidizing-chamber and provided with a gas-supply pipe and an oil-spray.

4. In an apparatus for treating ores, a rotatable inclined heating-chamber adapted to communicate with a source of supply, a gas-furnace, a rotatable inclined deoxidizing-chamber arranged over the gas-furnace and adapted to communicate with the heating-chamber and with the gas-furnace, a regenerating-chamber arranged below the heating-chamber and adapted to communicate with the gas-furnace, and a tube communicating with the upper end of said deoxidizing-chamber and provided with a gas-supply pipe and an oil-spray.

5. An apparatus for treating ores comprising a rotatable inclined heating-chamber adapted to communicate with a source of supply, a gas-furnace, a rotatable inclined deoxidizing-chamber arranged over said gas-furnace, a vertical passage between the two chambers, a slide-valve operating in said passage, a vertical passage between the deoxidizing-chamber and the furnace, a regenerating-chamber, means for establishing communication between the regenerating-chamber and the gas-furnace, and a tube communicating with said deoxidizing-chamber and provided with a gas-supply pipe and an oil-spray.

6. In an apparatus for treating ores, the combination of a heating-chamber, a deoxidizing-chamber, a gas-furnace, and a regenerating-chamber, a passage for establishing communication between the heating-chamber and the deoxidizing-chamber in such a way that the ore shall pass by gravitation from the upper to the lower, a passage for establishing communication between the deoxidizing-chamber and the gas-furnace in such a way that the ore shall pass by gravitation from the upper to the lower, a plurality of flues and a passage for establishing communication between the gas-furnace and the regenerating-chamber, and a tube communicating with the said deoxidizing-chamber and provided with a gas-supply pipe.

7. In an apparatus for treating ores, a rotatable internally-heated heating-chamber adapted to communicate with a source of ore-supply, a gas-furnace, a rotatable deoxidizing-chamber arranged at a higher level than the gas-furnace and adapted to communicate with the heating-chamber, and with the gas-furnace, a regenerating-chamber arranged at a lower level than the heating-chamber and adapted to communicate with the gas-furnace, and a tube communicating with the said deoxidizing-chamber and provided with a gas-supply pipe and an oil-spray.

8. In an apparatus for treating ores, a rotatable inclined heating-chamber adapted to communicate with a source of ore-supply, a gas-furnace, a rotatable inclined deoxidizing-chamber arranged at a higher level than the gas-furnace and adapted to communicate with the heating-chamber and with the gas-furnace, a regenerating-chamber, arranged at a lower level than the heating-chamber and adapted to communicate with the gas-furnace, and a tube communicating with the said deoxidizing-chamber and provided with a gas-supply pipe.

9. An apparatus for treating ores comprising a rotatable inclined internally-heated heating-chamber adapted to communicate with a source of ore-supply, a gas-furnace, a rotatable inclined deoxidizing-chamber arranged at a higher level than the said gas-furnace and at a lower level than the heating-chamber, a passage between the two chambers so arranged that the ore may pass by gravitation from the heating-chamber to the deoxidizing-chamber, a slide-valve operating in said passage and adapted to so regulate the orifice that while allowing free passage to the ore it shall at the same time prevent escape of deoxidizing-gases, a passage between the deoxidizing-chamber and the furnace so arranged that the ore shall pass by gravitation from the deoxidizing-chamber to the furnace, a regenerating-chamber, means for establishing communication between the regenerating-chamber and the gas-furnace, and a tube connecting with the said deoxidizing-chamber provided with a gas-supply pipe.

10. In an apparatus for treating ores, the combination with an internally-heated chamber, a deoxidizing-chamber, a gas-furnace and a regenerating-chamber, of means for establishing communication between said internally-heated chamber and said deoxidizing-chamber, means for establishing communication between said deoxidizing-chamber and the gas-furnace, means for establishing communication between the gas-furnace and said regenerating-chamber, and means for establishing communication between the regenerating-chamber and the internally-heated chamber.

11. In an apparatus for treating ores, the combination with a deoxidizing-chamber, means for supplying a deoxidizing-gas thereto, a gas-furnace, means for establishing communication between the gas-furnace and said deoxidizing-chamber, a regenerating-chamber communicating with said gas-furnace, an internally-heated chamber communicating with said deoxidizing-chamber and adapted to receive the material to be treated from which it passes into the deoxidizing-chamber, and means for establishing communication between the regenerating-chamber and said internally-heated chamber.

12. In an apparatus for treating ores, the combination with an internally-heated rotatable heating-chamber, a rotatable deoxidizing-chamber, a gas-furnace and a regenerating-chamber, of means for establishing communication between the internally-heated chamber and the deoxidizing-chamber, means for establishing communication between the deoxidizing-chamber and the gas-furnace, means for establishing communication between the gas-furnace and the regenerating-chamber, and means for establishing communication between the regenerating-chamber and the internally-heated chamber.

13. In an apparatus for treating ores, the combination with an internally-heated rotatable heating-chamber, a rotatable deoxidizing-chamber, a gas-furnace and a regenerating-chamber, of means for establishing communication between the internally-heated chamber and the deoxidizing-chamber, means for establishing communication between the deoxidizing-chamber and the gas-furnace, means for establishing communication between the gas-furnace and the regenerating-chamber, means for establishing communication between the regenerating-chamber and the internally-heated chamber, and a regulatable air-supplying means communicating with said regenerating-chamber.

14. In an apparatus for treating ores, the combination of an internally-heated chamber, a deoxidizing-chamber, a gas-furnace, a regenerating-chamber, a passage for establishing communication between the heating-chamber and the deoxidizing-chamber, a vertical passage for establishing communication between the deoxidizing-chamber and the gas-furnace, a plurality of flues and a passage for establishing communication between the gas-furnace and the regenerating-chamber, and means for establishing communication between the regenerating-chamber and the internally-heated chamber.

15. In an apparatus for treating ores, an internally-heated rotatable and inclined material-heating chamber communicating with a source of material-supply, a rotatable inclined deoxidizing-chamber adapted to communicate with said heating-chamber, a gas-furnace communicating with said deoxidizing-chamber, a regenerating-chamber, flues and a passage for connecting the regenerating-chamber with a gas-furnace, and a passage for connecting the regenerating-chamber with the heating-chamber.

16. In an apparatus for treating ores, an internally-heated rotatable and inclined material-heating chamber communicating with a source of material-supply, a rotatable inclined deoxidizing-chamber adapted to communicate with said heating-chamber, a gas-furnace communicating with said deoxidizing-chamber, a regenerating-chamber, flues and a passage for connecting the regenerating-chamber with a gas-furnace, a passage for connecting the regenerating-chamber with the heating-chamber, and means for supplying a deoxidizing-gas to said deoxidizing-chamber.

17. In an apparatus for treating ores, an internally-heated and rotatable heating-chamber adapted to communicate with a source of ore-supply, a gas-furnace, a rotatable deoxidizing-chamber arranged over the gas-furnace and adapted to communicate with the heating-chamber and with the gas-furnace, and a regenerating-chamber arranged below the heating-chamber and adapted to communicate with the gas-furnace and the heating-chamber.

18. In an apparatus for treating ores, an internally-heated and rotatable heating-chamber adapted to communicate with a source of ore-supply, a gas-furnace, a rotatable deoxidizing-chamber arranged over the gas-furnace and adapted to communicate with the heating-chamber and with the gas-furnace, a regenerating-chamber arranged below the heating-chamber and adapted to comunicate with the gas-furnace and the heating-chamber, and a gas-supply communicating with said deoxidizing-chamber.

19. In an apparatus for treating ores, an internally-heated rotatable and inclined heating-chamber adapted to communicate with a source of supply, a gas-furnace, a rotatable inclined deoxidizing-chamber arranged over the gas-furnace and adapted to communicate with the heating-chamber and with the gas-furnace, and a regenerating-chamber arranged below the heating-chamber and adapted to communicate with the gas-furnace and the heating-chamber.

20. In an apparatus for treating ores, an internally-heated rotatable and inclined heating-chamber adapted to communicate with a source of supply, a gas-furnace, a rotatable inclined deoxidizing-chamber arranged over the gas-furnace and adapted to communicate with the heating-chamber and with the gas-furnace, a regenerating-chamber arranged below the heating-chamber and adapted to communicate with the gas-furnace and the heating-chamber, and means for supplying gas to said deoxidizing-chamber.

21. In an apparatus for treating ores, an internally-heated rotatable and inclined heating-chamber adapted to communicate with a source of supply, a gas-furnace, a rotatable inclined deoxidizing-chamber arranged over the gas-furnace and adapted to communicate with the heating-chamber and with the gas-furnace, a regenerating-chamber arranged below the heating-chamber and adapted to communicate with the gas-furnace and the heating-chamber, means for supplying gas to said deoxidizing-chamber, and a regulating air-supply means for the said regenerating-chamber.

22. An apparatus for treating ores, comprising an internally-heated rotating and inclined heating-chamber adapted to communicate with a source of supply, a gas-furnace, a rotatable and inclined deoxidizing-chamber arranged over said gas-furnace, a passage between the two chambers, a slide-valve operating in said passage, a passage between the deoxidizing-chamber and the gas-furnace, a regenerating-chamber, means for establishing communication between the regenerating-chamber and the gas-furnace, and means for establishing communication between the regenerating-chamber and the heating-chamber.

23. In an apparatus for treating ores, a rotatable internally-heated heating-chamber adapted to communicate with a source of ore-supply, a rotatable deoxidizing-chamber arranged below said heating-chamber and adapted to communicate with said heating-chamber, a gas-furnace arranged below said deoxidizing-chamber and adapted to communicate therewith, a regenerating-chamber arranged below said heating-chamber and at the side and adjacent to said gas-furnace and said deoxidizing-chamber, means for establishing communication between the gas-furnace and the regenerating-chamber, means for establishing communication between the regenerating-chamber and the heating-chamber, and means for supplying a deoxidizing medium to said deoxidizing-chamber.

24. In an apparatus for treating ores, an internally-heated heating-chamber adapted to communicate with a source of ore-supply, a gas-furnace, a deoxidizing-chamber interposed between the heating-chamber and the gas-furnace, a generating-chamber, means for estabishing communication between the deoxidizing-chamber and the gas-furnace, means for supplying a deoxidizing medium to the deoxidizing-chamber, a passage for establishing communication between the heating-chamber and the deoxidizing-chamber, an adjustable closure for said passage, means opening into said regenerating-chamber and in said passage at a point above the said closure for establishing communication between the heating-chamber and the regenerating-chamber, and means for establishing communication between the regenerating-chamber and the gas-furnace.

25. In an apparatus for treating ores, an internally-heated heating-chamber adapted to communicate with a source of ore-supply, a gas-furnace, a deoxidizing-chamber interposed between the heating-chamber and the gas-furnace, a regenerating-chamber, means for establishing communication between the deoxidizing-chamber and the gas-furnace, means for supplying a deoxidizing medium to the deoxidizing-chamber, a passage for establishing communication between the heating-chamber and the deoxidizing-chamber, an adjustable closure for said passage, means opening into said regenerating-chamber and in said passage at a point above said closure for establishing communication between the heating-chamber and the regenerating-chamber, means for establishing communication between the regenerating-chamber and the gas-furnace, and a regulatable air-supply means for said regenerating-chamber.

26. In an apparatus for treating ores, a heating-chamber adapted to communicate with a source of ore-supply, a gas-furnace having a stationary and a rotatable section, a deoxidizing-chamber, means for establishing communication between the deoxidizing-chamber and said gas-furnace, means for establishing communication between the heating and the deoxidizing chamber, a regenerating-chamber, means for establishing communication between the gas-furnace and said regenerating-chamber, and means for establishing communication between said regenerating-chamber and said heating-chamber.

27. In an apparatus for treating ores, a heating-chamber adapted to communicate with a source of ore-supply, a gas-furnace having a fixed and a rotatable section, a deoxidizing-chamber, a regenerating-chamber, means for establishing communication between the deoxidizing-chamber and the gas-furnace, a passage for establishing communication between the deoxidizing-chamber and the heating-chamber, an adjustable closure for said passage, means opening into the regenerating-chamber and into said passage at a point above said closure for establishing communication between the regenerating-chamber and the heating-chamber, and means for establishing communication between the regenerating-chamber and the gas-furnace.

28. In an apparatus for treating ores, a heating-chamber adapted to communicate with a source of ore-supply, a gas-furnace having a fixed and a rotatable section, a deoxidizing-chamber, a regenerating-chamber, means for establishing communication between the deoxidizing-chamber and the gas-furnace, a passage for establishing communication between the deoxidizing-chamber and the heating-chamber, an adjustable closure for said passage, means opening into the regenerating-chamber and into said passage at a point above said closure for establishing communication between the regenerating-chamber and the heating-chamber, means for establishing communication between the regenerating-chamber and the gas-furnace, and a regulatable air-supply means for said regenerating-chamber.

29. In an apparatus for treating ores, a heating-chamber adapted to communicate with a source of ore-supply, a gas-furnace having a fixed and a rotatable section, a deoxidizing-chamber, a regenerating-chamber, means for establishing communication between the deoxidizing-chamber and the gas-furnace, a passage for establishing communication between the deoxidizing-chamber and the heating-chamber, an adjustable closure for said passage, means opening into the regenerating-chamber and into said passage at a point above said closure for establishing communication between the regenerating-chamber and the heating-chamber, means for establishing communication between the regenerating-chamber and the gas-furnace, regulatable air-supply means for said regenerating-chamber, and means for supplying a deoxidizing medium to said deoxidizing-chamber.

30. In an apparatus for treating ores, a rotatable and inclined internally-heated heating-chamber adapted to communicate with a source of ore-supply, a gas-furnace, a rotatable and inclined deoxidizing-chamber, means for supplying a heating medium to said deoxidizing-chamber, a regenerating-chamber, a passage for establishing communication between the deoxidizing-chamber and the heating-chamber, a closure for said passage, means opening into said regenerating-chamber and into the passage above the closure for establishing communication between the heating-chamber and the regenerating-chamber, and means for establishing communication between the regenerating-chamber and the gas-furnace.

31. In an apparatus for treating ores, a rotatable and inclined internally-heated heating-chamber adapted to communicate with a source of ore-supply, a gas-furnace, a rotatable and inclined deoxidizing-chamber, means for supplying a heating medium to said deoxidizing-chamber, a regenerating-chamber, a passage for establishing communication between the deoxidizing-chamber and the heating-chamber, a closure for said passage, means opening into said regenerating-chamber and into the passage above the closure for establishing communication between the heating-chamber and the regenerating-chamber, means for establishing communication between the regenerating-chamber and the gas-furnace, and a regulatable air-supply means for said regenerating-chamber.

32. An apparatus for treating ores, comprising a rotatable inclined internally-heated heating-chamber adapted to communicate with a source of ore-supply, a gas-furnace, a rotatable inclined deoxidizing-chamber arranged at a higher level than the said gas-furnace and at a lower level than the said heating-chamber, a passage between the two chambers so arranged that the ore may pass by gravity from the heating-chamber to the deoxidizing-chamber, a slide-valve operating in said passage and adapted when adjusted to allow free passage of the ore and prevent the escape of the deoxidizing-gas, a passage between the deoxidizing-chamber and the furnace so arranged that the ore can pass by gravity from the deoxidizing-chamber to the gas-furnace, a regenerating-chamber, means for establishing communication between the regenerating-chamber and the gas-furnace, and means for establishing communication between the regenerating-chamber and the heating-chamber.

33. An apparatus for treating ores, comprising a rotatable inclined internally-heated heating-chamber adapted to communicate with a source of ore-supply, a gas-furnace, a rotatable inclined deoxidizing-chamber arranged at a higher level than the said gas-furnace and at a lower level than the said heating-chamber, a passage between the two chambers so arranged that the ore may pass by gravity from the heating-chamber to the deoxidizing-chamber, a slide-valve operating in said passage and adapted when adjusted to allow free passage of the ore and prevent the escape of the deoxidizing-gases, a passage between the deoxidizing-chamber and the gas-furnace so arranged that the ore can pass by gravity from the deoxidizing-chamber to the gas-furnace, a regenerating-chamber, means for establishing communication between the regenerating-chamber and the gas-furnace, means for establishing communication between the regenerating-chamber and the heating-chamber, and means for supplying a gas to said deoxidizing-chamber.

34. An apparatus for treating ores, comprising a rotatable inclined internally-heated heating-chamber adapted to communicate with a source of ore-supply, a gas-furnace, a rotatable inclined deoxidizing-chamber arranged at a higher level than the said gas-furnace and at a lower level than the said heating-chamber, a passage between the two chambers so arranged that the ore may pass by gravity from the heating-chamber to the deoxidizing-chamber, a slide-valve operating in said passage and adapted when adjusted to allow free passage of the ore and prevent the escape of the deoxidizing-gases, a passage between the deoxidizing-chamber and the gas-furnace so arranged that the ore can pass by gravity from the deoxidizing-chamber to the gas-furnace, a regenerating-chamber, means for establishing communication between the regenerating-chamber and the gas-furnace, means for establishing communication between the regenerating-chamber and the heating-chamber, means for supplying a gas to said deoxidizing-chamber, and a regulatable air-supply means for said regenerating-chamber.

In testimony whereof we have hereunto set our hands in presence of two subscribing witnesses.

MONTAGUE MOORE.
THOMAS JAMES HESKETT.

Witnesses:
WALTER S. BAYSTON,
FRANK BAYSTON.